April 19, 1949.  G. LOWKRANTZ  2,467,899
ADJUSTABLE INDICATING STRUCTURE
ON A MEASURING APPARATUS
Filed Oct. 24, 1945

GUNNE LOWKRANTZ
*INVENTOR.*

BY
ATTORNEYS

Patented Apr. 19, 1949

2,467,899

UNITED STATES PATENT OFFICE 2,467,899

ADJUSTABLE INDICATING STRUCTURE ON A MEASURING APPARATUS

Gunne Lowkrantz, Binghamton, N. Y., assignor to Link Aviation Devices, Inc., Binghamton, N. Y., a corporation of New York Application October 24, 1945, Serial No. 624,217

3 Claims. (Cl. 116—124)

My invention relates to means for accurately determining the position of a movable member and will be illustrated as it may be applied to a sextant. However, it will be appreciated, after reading the specification and studying the drawings appended hereto, that my improved apparatus may be applied to many types of mechanism where it is necessary to accurately determine a value which is dependent upon the angular or linear position of a member.

In order that the exact nature of my invention may be better understood, reference is made to the accompanying drawings in which, Fig. 1 indicates schematically the essential parts of a sextant and one manner in which my invention may be used therewith.

Figure 1:
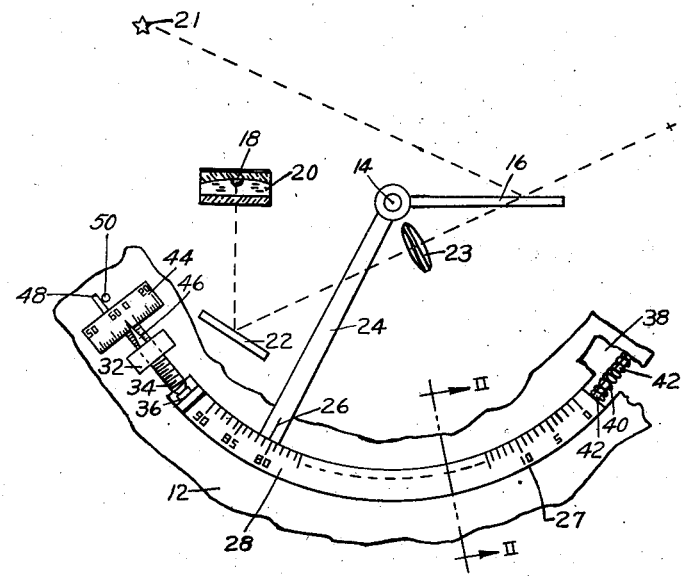

Referring to the accompanying drawings, the numeral 12 designates a conventional sextant casing in which the main shaft 14 may be suitably rotatably mounted. Affixed upon the shaft 14 is the conventional index mirror 16, this index mirror being the member whose position it is desired to accurately determine. It will be appreciated that the index mirror 16 may be moved by the observer by a rotation of the main shaft 14 in order to bring the images of the bubble 18 of the artificial horizon 20 and celestial body 21 into optical coincidence. The reflecting mirror 22 reflects the image of the bubble 18 to the optical index mirror 16 through the collimating lens 23.

The index arm 24 is also affixed to the main shaft 14 for rotation therewith and with the index mirror 16 so that the position of the index arm 24 is at all times dependent upon the position of the index mirror 16. It will be noted that the lower end of the index arm 24 carries an index mark 26.

Figure 2:
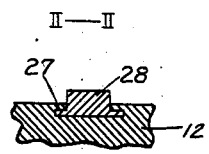
Fig. 2 is a cross-sectional view taken along the lines II—II of Fig. 1.

The sextant casing 12 is provided with a suitable track 27, this track being T-shaped in cross-section as clearly shown in Fig. 2. It will be noted that the index scale 28 is shaped, in cross-section, complementary to the track 27 so that it is held within the track and yet is free to move along the same. It will be noted that the scale 28 is graduated, in the illustrated case in terms of degrees from zero through 90, and that both the track 27 and scale 28 are arcuate so that as the arm 24 is rotated the index 26 thereupon will always be adjacent the graduations upon scale 28.

Fixedly carried by the frame 12 of the sextant is the nut 32 in which the screw 34 is rotatably carried. The end of screw 34 adjacent scale 28 frictionally engages the nub 36 which is formed integral with scale 28. A cut-out portion 38 is provided in the sextant casing 12 at the other end of scale 28 and a compression spring 40 is placed in this cut-out portion, suitable guides and supporting members 42 being affixed to the sextant frame 12 and to the end of scale 28 in order to position spring 40. It will be appreciated that the spring 40 bears against the scale 28 at all times so that the nub 36 always engages the adjacent end of screw 34.

Fixedly mounted upon the outer end of screw 34 is the index drum 44 which in the case of a sextant is graduated in minutes of arc from zero through 60. A suitable stationary index 46 is carried by the nut 32 adjacent the drum 44 to cooperate with the graduations thereupon.

Figure 3:
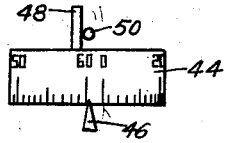
Figs. 3 and 4 are enlarged views of one of the scales and associated parts which may be used with my invention.
Figure 4:
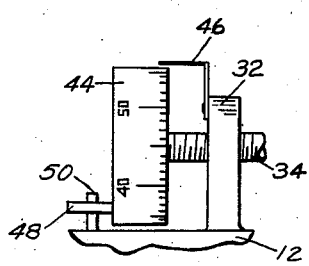

Referring now to Fig. 3, it will be seen that the drum 44 is not graduated throughout 360 degrees, but that a short distance is present between the zero and 60 minute graduations. Fixedly carried by the drum 44 at a point 180 degrees opposite the space between the 55 and 60 minute graduations, is the pin 48. As shown in Figs. 3 and 4, a stop 50 is fixedly carried by the sextant casing 12. Whenever the drum 44 in Fig. 3 is rotated counterclockwise as seen from the lower right in Fig. 3 until the pin 48 engages the stop 50, the index 46 is exactly coincident with the 60 minute graduation upon drum 44. On the other hand, should the drum 44 be rotated clockwise from the position seen in Fig. 3 until the pin 48 engages the other side of stop 50, it will be appreciated that the drum 44 will be rotated through slightly less than one revolution and that the index mark 46 will exactly coincide with the zero graduation upon drum 44. It will therefore be appreciated that the drum 44 can never be rotated through 360 degrees.

In explanation it may be stated that the lead of screw 34 and the graduations upon drum 44 are such that when drum 44 is rotated through sixty minutes of graduations, the scale 28 should move along the track 27 exactly the distance between two of the adjacent graduations thereupon. Thus in the instant illustrated case, for a given angular movement of drum 44, representative of a given number of minutes of arc, the scale 28 is moved along the track 27 the proper proportional amount of the distance between any two of the adjacent marks thereupon.

In the use of the previously disclosed measuring apparatus, after the observer has manipulated the conventional and well known controls of the sextant so that the index mirror 16 is positioned at the point whose value it is desired to ascertain, the position of the index mark 26 relative to the graduations along the scale 28 is ascertained—in the illustrated case 80 plus a fraction. The drum 44 is then rotated clockwise as seen from the left in Fig. 1 until the spring 40 has moved the index scale 28 to the left so that the index mark 26 upon the arm 24 is exactly opposite the 80 degree mark upon the index scale 28. The value of the index mark upon the drum 44 closest to the index 46 is then ascertained. The exact reading desired is then the whole number of degrees as shown by the relative positions of the index mark 26 and the scale 28— in the illustrated case 80—plus the resultant reading obtained by reference to the index 46 and the drum 44—in the illustrated case about 15—or 80 degrees 15 minutes.

Inasmuch as the drum 44 can never be rotated through more than sixty minutes of graduations, it is impossible for the user of the instrument to secure an erroneous reading. It is only necessary that the operator rotate the drum 44 until the index mark 26 coincides exactly with one of the graduations upon the index scale 28. This reading is the number of degrees, and the number of minutes may be ascertained by noting the position of the drum 44 relative to the index 46. For initially adjusting the previously described apparatus, in the illustrated case the drum 44 is positioned so that the index 46 is opposite the zero mark on the drum. Index arm 24 is then moved until the index mark 26 is opposite the zero mark upon scale 28. The index mirror 16 is then fixed upon shaft 14 in the zero position. Thereafter the entire apparatus will always function properly so that the instant position of the index mirror 16 may be ascertained at any time. It is not necessary that the scale 28 and drum 44 be returned to any particular position after an observation is made and before a later observation is taken because the displacement of the scale 28 from its initial zero position is always shown by reference to the index 46 and the drum 44.

A magnifying glass, either carried manually or affixed upon the index arm 24 above the index mark 26 may be used to determine the exact coincidence of the index mark 26 with the graduations upon scale 28.

It will be appreciated by those skilled in the art that changes may be made in the disclosed embodiment of my invention without departing from the scope thereof, and further, that my invention may be useful when adapted for use upon other types of instruments and devices than that disclosed herein. All such changes and all such variations in application are intended to be covered by the following claims.

I claim:

1. A measuring apparatus of the class described comprising, in combination with a movable member the position of which is to be determined, a first index mark movable with said movable member and a first graduated scale arranged for cooperation with said index mark and independently movable relative to the index mark, a second index mark and a second graduated scale arranged for cooperation with one another, one of said last two elements being movable relative to the other, and a micrometer drive between the movable one of said last two elements and the first graduated scale for moving the first graduated scale relative to the first index mark in response to the relative movements between the second index mark and the second scale.

2. In a sextant or similar instrument the combination of a movable member, a first index mark and a first graduated scale arranged for cooperation with said index mark, said index mark being movable with said movable member relative to said graduated scale and said graduated scale being independently movable relative to said index mark, a second index mark and a second graduated scale arranged for cooperation with one another, one of said last two elements being movable relative to the other, and a micrometer drive between the movable one of said last two elements and the first graduated scale for moving the first graduated scale relative to the first index mark in response to the relative movements between the second index mark and the second scale.

3. A measuring apparatus of the class described comprising, in combination with a movable member the position of which is to be determined, a first index means comprising an index mark and a graduated scale arranged for cooperation with one another, one of said last mentioned members being affixed to said movable member and the other being independently movable, a second index means comprising an index mark and a graduated scale, one of said last two elements being movable relative to the other, and a micrometer drive between the movable one of said last two elements and the independently movable member of the first index means for moving the same in response to relative movements between the elements of the second index means.

GUNNE LOWKRANTZ.

REFERENCES CITED

The following references are of record in the file of this patent:

UNITED STATES PATENTS

| Number | Name | Date |
|---|---|---|
| 552,751 | Denison | Jan. 7, 1896 |
| 751,647 | Hutchins | Feb. 9, 1904 |
| 891,621 | Konig | June 23, 1908 |
| 1,592,121 | Moore | July 13, 1926 |
| 2,364,764 | Wilks | Dec. 12, 1944 |
| 2,411,870 | Chauret | Dec. 3, 1946 |

FOREIGN PATENTS

| Number | Country | Date |
|---|---|---|
| 508,871 | France | Aug. 4, 1920 |
| 332,021 | Germany | Jan. 19, 1921 |